United States Patent
Cheung

(10) Patent No.: US 8,468,183 B2
(45) Date of Patent: Jun. 18, 2013

(54) METHOD AND APPARATUS FOR AUTOMATIC DETECTION AND IDENTIFICATION OF BROADCAST AUDIO AND VIDEO SIGNALS

(75) Inventor: Kwan Cheung, Bryn Mawr, PA (US)

(73) Assignee: Mobile Research Labs Ltd., Hod Hasharon (IL)

( * ) Notice: Subject to any disclaimer, the term of this patent is extended or adjusted under 35 U.S.C. 154(b) by 1436 days.

(21) Appl. No.: 10/598,283

(22) PCT Filed: Feb. 16, 2005

(86) PCT No.: PCT/US2005/004802
§ 371 (c)(1),
(2), (4) Date: Aug. 23, 2006

(87) PCT Pub. No.: WO2005/081829
PCT Pub. Date: Sep. 9, 2005

(65) Prior Publication Data
US 2007/0168409 A1 Jul. 19, 2007

Related U.S. Application Data

(60) Provisional application No. 60/547,931, filed on Feb. 26, 2004.

(51) Int. Cl.
*G06F 7/00* (2006.01)
(52) U.S. Cl.
USPC .......................... 708/200; 708/400; 348/14.02
(58) Field of Classification Search
None
See application file for complete search history.

(56) References Cited

U.S. PATENT DOCUMENTS

| | | | |
|---|---|---|---|
| 5,436,653 A * | 7/1995 | Ellis et al. | 725/22 |
| 5,612,729 A | 3/1997 | Ellis et al. | |
| 5,651,094 A | 7/1997 | Takagi et al. | |
| 5,918,223 A | 6/1999 | Blum et al. | |
| 6,675,174 B1 | 1/2004 | Bolle et al. | |
| 6,766,523 B2 | 7/2004 | Herley | |
| 7,565,104 B1 | 7/2009 | Brown et al. | |
| 2002/0002541 A1 | 1/2002 | Williams | |
| 2002/0099555 A1 | 7/2002 | Pitman et al. | |
| 2003/0086341 A1 | 5/2003 | Wells et al. | |
| 2003/0154084 A1 | 8/2003 | Li et al. | |
| 2004/0091111 A1 | 5/2004 | Levy et al. | |
| 2004/0162728 A1 | 8/2004 | Thomson et al. | |
| 2004/0193642 A1 | 9/2004 | Allen et al. | |

(Continued)

FOREIGN PATENT DOCUMENTS

WO WO-2005/081829 A2 9/2005

*Primary Examiner* — Michael D Yaary
(74) *Attorney, Agent, or Firm* — Ted Sabety, Esq; Sabety & Associates PLLC

(57) ABSTRACT

This invention relates to the automatic detection and identification of broadcast programming, for example music, speech or video that is broadcast over radio, television, the Internet or other media. "Broadcast" means any readily available source of content, whether now known or hereafter devised, including streaming, peer to peer delivery or detection of network traffic. A known program is registered by deriving a numerical code for each of many short time segments during the program and storing the sequence of numerical codes and a reference to the identity of the program. Detection and identification of an input signal occurs by similarly extracting the numerical codes from it and comparing the sequence of detected numerical codes against the stored sequences. Testing criteria is applied that optimizes the rate of correct detections of the registered programming. Other optimizations in the comparison process are used to expedite the comparison process.

26 Claims, 13 Drawing Sheets

U.S. PATENT DOCUMENTS

| | | |
|---|---|---|
| 2005/0125223 A1 | 6/2005 | Divakaran et al. |
| 2005/0197724 A1 | 9/2005 | Neogi |
| 2006/0080356 A1 | 4/2006 | Burges et al. |
| 2006/0149552 A1 | 7/2006 | Bogdanov |
| 2006/0190450 A1 | 8/2006 | Holm et al. |
| 2007/0055500 A1 | 3/2007 | Bilobrov |

* cited by examiner

| K | $s_{k,1}$ | $s_{k,2}$ |
|---|---|---|
| 10 | 66 | 92 |
| 11 | 93 | 129 |
| 12 | 130 | 182 |
| 13 | 183 | 255 |
| 14 | 256 | 357 |
| 15 | 358 | 501 |
| 16 | 502 | 702 |
| 17 | 703 | 984 |
| 18 | 985 | 1378 |
| 19 | 1379 | 1930 |
| 20 | 1931 | 2702 |
| 21 | 2703 | 3784 |
| 22 | 3785 | 5298 |

Fig. 9

| | |
|---|---|
| 80 | 111 |
| 112 | 156 |
| 157 | 219 |
| 220 | 306 |
| 307 | 429 |
| 430 | 602 |
| 603 | 843 |
| 844 | 1181 |
| 1182 | 1654 |
| 1655 | 2316 |
| 2317 | 3243 |
| 3244 | 4541 |

Fig. 10

| | |
|---|---|
| 66 | 129 |
| 130 | 255 |
| 256 | 501 |
| 80 | 156 |
| 157 | 306 |
| 307 | 602 |

Fig. 11

| Starting Location | Ending Location |
|---|---|
| 66 | 92 |
| 93 | 129 |
| 130 | 182 |
| 183 | 255 |
| 256 | 357 |
| 358 | 501 |
| 502 | 702 |
| 703 | 984 |
| 985 | 1378 |
| 1379 | 1930 |
| 1931 | 2702 |
| 2703 | 3784 |
| 3785 | 5298 |
| 66 | 129 |
| 130 | 255 |
| 256 | 501 |
| 80 | 111 |
| 112 | 156 |
| 157 | 219 |
| 220 | 306 |
| 307 | 429 |
| 430 | 602 |
| 603 | 843 |
| 844 | 1181 |
| 1182 | 1654 |
| 1655 | 2316 |
| 2317 | 3243 |
| 3244 | 4541 |
| 80 | 156 |
| 157 | 306 |
| 307 | 602 |

Fig. 12

| Starting Location | Ending Location |
|---|---|
| 67 | 94 |
| 95 | 132 |
| 133 | 186 |
| 187 | 260 |
| 261 | 364 |
| 365 | 511 |
| 512 | 716 |
| 717 | 1004 |
| 1005 | 1406 |
| 1407 | 1969 |
| 1970 | 2756 |
| 2757 | 3860 |
| 3861 | 5404 |
| 67 | 132 |
| 133 | 260 |
| 261 | 511 |
| 82 | 113 |
| 114 | 159 |
| 160 | 223 |
| 224 | 312 |
| 313 | 438 |
| 439 | 614 |
| 615 | 860 |
| 861 | 1205 |
| 1206 | 1687 |
| 1688 | 2362 |
| 2363 | 3308 |
| 3309 | 4632 |
| 82 | 159 |
| 160 | 312 |
| 313 | 614 |

Fig. 13

METHOD AND APPARATUS FOR AUTOMATIC DETECTION AND IDENTIFICATION OF BROADCAST AUDIO AND VIDEO SIGNALS

This application is a 371 National Stage Entry of PCT/US05/04802 filed on Feb. 16, 2005 which claims priority to U.S. Provisional Patent Application No. 60/547,931 filed on Feb. 26, 2004.

BACKGROUND AND SUMMARY OF THE INVENTION

This invention relates to the automatic detection and identification of broadcast programming, for example music or speech that is broadcast over radio, television or the Internet, or television signals, whether broadcast as analog, digital or digital over the Internet. By "Broadcast" it is meant any readily available source of content, whether now known or hereafter devised, including, for example, streaming, peer to peer delivery of downloads or streaming or detection of network traffic comprising such content delivery activity. The system initially registers a known program by digitally sampling the program and separating the digital sample stream into a large set of short segments in time. These segments are then processed to extract particular feature sets that are characteristic of the segment. The invention processes each set of features to produce a numerical code that represents the feature set for a particular segment of the known program. These codes and the registration data identifying the program populate a database as part of the system. Once registration of one or more programs is complete, the system can then detect and identify the presence of the registered programming in a broadcast signal by extracting a feature set from the input signal, producing a numerical code for each time segment input into the system and then comparing the sequence of detected numerical codes against the numerical codes stored in the database. Various testing criteria are applied during the comparison process in order to reduce the rate of false positives, false negatives and increase correct detections of the registered programming. The invention also encompasses certain improvements and optimizations in the comparison process so that it executes in a relatively short period of time.

BRIEF DESCRIPTION OF THE DRAWINGS

FIG. 9: Table 1 of Calculation of Frequency Band Boundaries.

FIG. 10: Table 2 of Calculation of Frequency Band Boundaries.

Figure 11:
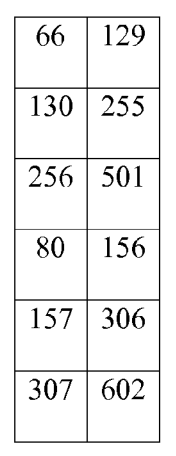

FIG. 11: Table 3 of Calculation of Frequency Band Boundaries

FIG. 12: Table 4 showing starting and ending locations of the 31 bands in the generation of robust patterns.

FIG. 13: Table 5 showing starting and ending locations.

DETAILED DESCRIPTION OF THE PREFERRED EMBODIMENTS

Background

Figure 1:
FIG. 1: The components of the media broadcast monitoring system.
Figure 2:
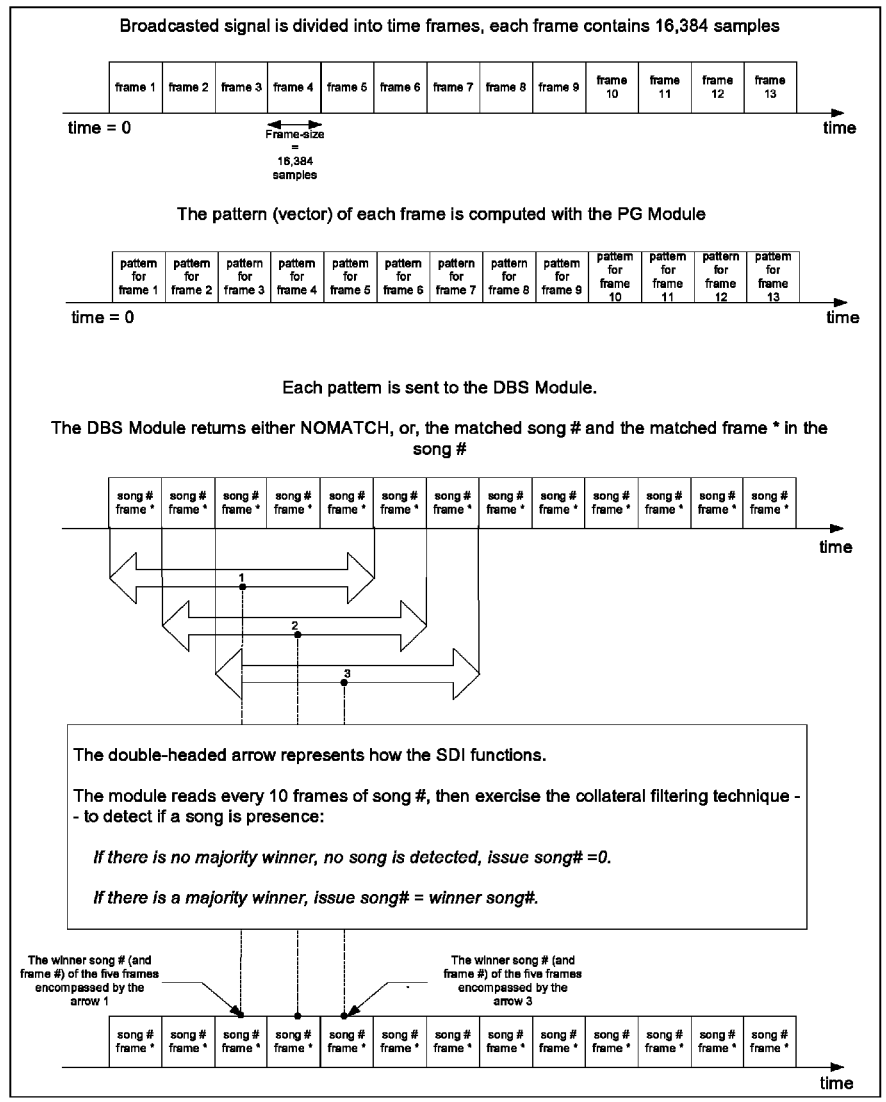
FIG. 2: An illustration of the data flow of the detection algorithm from a series of frames of an audio program to detection of the program's identity.

The present invention relates to the automatic recognition of widely disseminated programming, such as radio, television or digitally delivered content over the Internet.

Owners of copyrights in broadcast programming, including advertisers, need to measure when and where their programming has been broadcast in order to correctly compute performance royalties, confirm compliance with territorial restrictions or verify that certain advertising has been aired as scheduled. The traditional method for monitoring the radio or television has involved using humans to listen or watch and then record that which they hear or see, or alternatively, rely on the broadcast records of radio and television stations. This is a labor intensive process that has limited efficiency or accuracy. It is an object of the invention to use advanced computing systems to fully automate this process. In this manner, audio or video content is registered into the system, and then, in the case of audio detection, radio, the soundtrack from television or other sources of widely distributed audio content are input into the system. In the case of video, the video signal is input into the system from whatever its source. By means of the invention, the detection and identification of registered programming content takes place automatically.

PRIOR ART

A number of methods have been developed to automate the detection of broadcast programming. These techniques generally fall into one of two categories: cue detection or pattern recognition. The cue detection method is exemplified by U.S. Pat. No. 4,225,967 to Miwa et. al.; U.S. Pat. No. 3,845,391 to Crosby and U.S. Pat. No. 4,547,804 to Greenberg. These techniques rely on embedded cues inserted into the program prior to distribution. These approaches have not been favored in the field. In audio, the placement of cue signals in the program have limited the acceptance of this approach because it requires the cooperation of the program owners and/or broadcasters—thus making it impractical.

The pattern recognition method generally relies on the spectral characteristics of the content itself to produce a unique identifying code or signature. Thus, the technique of identifying content consists of two steps: the first being extracting a signature from a known piece of content for insertion into a database, and the second being extracting a signature from a detected piece of content and searching for a signature match in the database in order to identify the detected content. In this way, the preferred approach relies on characteristics of the broadcast content itself to create a signature unique to that content. For example, U.S. Pat. No. 4,739,398 to Thomas, et. al. discloses a system that takes a known television program and creates for each video frame, a signature code out of both the audio and the video signal within that frame. More recently, similar detection systems have been proposed for Internet distributed content, for example application PCT WO 01/62004 A2, filed by Ikeyoze et. al.

For audio by itself, U.S. Pat. No. 3,919,471 to Moon discloses an audio identification system where only audio signals are used, but it is of limited utility because it attempts to correlate an audio program represented by a limited time slice against the incoming broadcast signal. The disclosed method of matching in Moon is highly compute intensive because it relies on direct signal correlation. Further, this approach is unfavorable because it has been found to be limited in accuracy, especially if the program is time compressed or altered in other ways prior to detection. It is also prone to false positive identifications and is computationally uneconomic if the size of the time slice is expanded to improve its correct identifications. Lert, et. al. describes in U.S. Pat. No. 4,230,990 a way to mitigate the computational workload of the correlation method by combining it with the coding method of the first category: either an artificial code or some other naturally occurring marker is detected in the program indicating the beginning of a section of the program, and then a feature signature is measured at a pre-determined amount of time later. This method has limited utility in audio-only applications, where either an audible code has to be inserted into the audio to create the cue, thus degrading it or requiring cooperation of the content source, or reliance on natural markers indicating the start of a new audio program which is highly unreliable. In U.S. Pat. No. 4,677,466 Lert, et. al. further describes an improvement on the invention that waits until a "stability condition" has occurred in the signal before measuring and calculating a signature, but the reliability of the method is limited by the size of the sample time slice. U.S. Pat. No. 4,739,398 to Thomas et. al. addresses the data processing load problem by randomly choosing portions of a signal to sample as input to the invention's signature generating process.

U.S. Pat. No. 5,436,653 to Ellis, et. al. and U.S. Pat. No. 5,612,729 to Ellis, et. al., disclose a more complex way of calculating a unique signature, where the audio signature corresponding to a given video frame is derived by comparing the change in energy in each of a predetermined number of frequency bands between the given video frame and the same measurement made in a prior video frame. However, the matching technique relies on a combination of the audio and video signatures or the use of a natural marker, in this case, the start or ending of a program. Thus, this method suffers the same problem as Lert with regard to audio-only programming.

In addition, U.S. Pat. No. 5,918,223 to Blum, et. al., discloses the use of audible features within audio programming to create a single signature value for each audio program, particularly the group of amplitude, pitch (i.e. fundamental), bandwidth, bass (i.e. rhythm analysis), brightness (i.e. shape of the frequency response of the program), and Mel-frequency cepstral coefficients. The aggregation of these detailed features across long periods in the audio produce highly variable results, and do not possess sufficient robustness in real-world broadcast situations. U.S. Pat. Nos. 5,210,820 and 4,843,562, both to Kenyon, discloses a digital circuit that uses the envelope (e.g loudness) features in the audio signal in order to create a signature. The approach is designed to address the time compression problem by application of time warping techniques. Reliance on loudness has other robustness problems that also make it difficult to use in real-world environments. U.S. Pat. Application No. 20030086341 filed by Wells, Maxwell, et. al., discloses a system where an audio signature is created using pre-determined numbers of digital samples counted from pre-determined locations from the start point of the music. This approach is much less reliable for broadcast or cases where the audio is detected in analog form, or in cases where the playback of the programming has changed speed, frequency equalization from the original track has been applied, or the audio dubbed into the programming segment.

The present invention describes a system and method whereby identification of known audio or video programming can be done without any reliance on a tandem video signal (in the audio case) or normative markers in the signal indicating a known time in the program and with unique and novel ways to calculate codes representing the characteristics of the audio program without requiring impractical computational capabilities. Benefits of this system and method are accuracy, speed, robustness to playback speed variation and the ability to perform the identification process in real time, without reliance on any embedded cue or watermark. In addition, the present invention takes advantage of the availability of low cost, high performance computing platforms in order to implement a high speed database searching methodology.

DETAILED DESCRIPTION

A. Overview

The broadcast monitoring and detection system embodying the invention works in two phases: registration and detection. During the registration phase, known programming content is registered with the system by sending the program, as digital data, into the system. A series of signatures, in the case here, a pattern vector and more generally in the art a "fingerprint" or "signature", are stored as a sequence of data records in a database, with the identity of the program content cross-referenced to them as a group. During the second phase, unidentified programming is input into the system. Such programming can include radio, television, internet broadcasts or any other source of audio or video programming, whether terrestrial broadcast, satellite, internet, cable television or any other medium of delivery, whether now known or devised in the future. While such programming is being monitored, the pattern vectors of the programming (or any other signature generating technique) are continually calculated. The calculated pattern vectors are then used to search for a match in the database. When a match is found and confirmed, the system uses the cross-referenced identity in the database to provide the identity of the content that is currently being played. In the preferred embodiment, the system is software running on a computer, however, it is envisioned that special purpose hardware components may replace parts or all of each module in order to increase performance and capacity of the system.

In the preferred embodiment, a computer containing a central processing unit is connected to a sound card or interface device into which audio programming is presented. During the registration phase, the CPU fetches the audio or video data from the sound card, calculates the pattern vector data, and then, along with timing data and the identity of the program, these results are stored in a database, as further described below. Alternatively, the data may be loaded directly from authentic material, such as compact discs, mp3 files or any other source of digital data embodying the signal. For non-audio applications, the source of material can be DVD disks, masters provided by movie studios, tapes or any other medium of expression on which the program is fixed or stored. Of course, for some material which may not have a readily available source, then the audio or other program signal is used in the following manner. If the system periodically detects an unknown program but with the substantially the same set of signatures each time, it assigns an arbitrary identifier for the program material and enters the data into the database as if the program had been introduced during the registration phase. Once the program identity is determined in the future, then the database can be updated to include the appropriate information as with authentic information while at the same time providing the owner of the programming the use data detected even when the identity of the program was not yet known. The database, which is typically a data file stored on a hard drive connected to the central processing unit of the computer by means of any kind of computer bus or data transmission interface, including SCSI.

During the detection phase, the CPU fetches the program data from the sound card or video card, or loads it from a data file that may be stored on the computer hard drive or external media reader. The CPU calculates the pattern vector data, and then, along with the timing data, submits database queries to the database stored on the hard drive. The database may be the same hard drive as in the computer, or an external hard drive accessed over a digital computer network. When matching data is found, the CPU continues to process the data to confirm the identification of the programming, as described further below. The CPU can then communicate over any of a wide variety of computer networking systems well known in the art to deliver the identification result to a remote location to be displayed on a screen using a graphical user interface, or to be logged in another data file stored on the hard drive. The program that executes the method may be stored on any kind of computer readable media, for example, a hard drive, CD-ROM, EEPROM or floppy and loaded into computer memory at run-time. In the case of video, the signal can be acquired using an analog to digital video converter card, or the digital video data can be directly detected from digital video sources, for example, the Internet or digital television broadcast.

The system consists of four components. FIG. 1 shows the interconnection of the four modules: (1) a signal processing stage at the front end, (2) a pattern generation module in the middle, (3) followed by a database search engine module, and (4) a program recognition module at the end. During the registration phase, the results of the pattern generation module, which creates signatures for known audio or video content, are stored in the database and the search and pattern recognition modules are not used.

The function of each module is described in further detail below:

1. Sound Acquisition (SA) Module

The SA module, (1), receives audio data from a sound detection circuit and makes it available to the remaining modules. Practitioners of ordinary skill will recognize that there are a variety of products that receive analog audio or video and convert those signals into digital data. These devices can be any source of digital audio data, including an interface card in a personal computer that converts analog audio into digital audio data accessible by the computer's CPU, a stand alone device that outputs digital audio data in a standard format or a digital radio receiver with audio output. Alternatively, pre-detected signal in digital form can be accessed from storage devices connected to the system over typical data networks. The SA module regularly reads the data from the digital interface device or data storage and stores the data into a data buffer or memory to be accessed by the Pattern Generation module. Practitioners of ordinary skill will recognize that the typical digital audio system will provide a digital word at regular intervals, called the sampling rate. The sequence of digital words representing the audio signal are the digital audio samples. The invention organizes the samples into a series of time frames, which consist of a predetermined number of samples. The time frames are stored in sequence. Alternatively, data structures, stored in the computer memory (which includes the hard drive if the operating system supports paging and swapping), may be used where the time frames are not physically stored in sequence, but logically may be referenced or indexed in the sequence that they were detected by means of memory addressing.

In the preferred embodiment, the audio signal is conditioned in a manner known in the art, including low-pass filtering. In the preferred embodiment, the signal is sampled at a rate of 8000 Hz within the SA Module. In the preferred embodiment, 16,384 samples constitute a single frame. At this rate, the signal must be lowpass filtered for anti-aliasing purpose before being sampled. Higher sampling rates may be used, however, with the appropriate adjustments in the downstream calculations, as explained below.

In the case of video programming, the sound acquisition module essentially acts in an analogous manner: the video signal is acquired as a digital video signal, and converted to the frequency domain using well known methods on a video frame by frame basis. The invention will be explained in detail as applied to audio through a description of the preferred embodiment. However, the system and processes described are applicable to video as well as audio, where a signature or pattern vector has been periodically derived from the video signal. Reference is made to "A Technical Introduction to Digital Video", Charles A. Poynton, John Wiley & Sons, New York, ©1996.

2. Pattern Vector Generation PG) Module

The PG module operating during the detection phase, (2), fetches the stored digital audio or video samples that were detected and stored by the SA Module. Once a frame of the samples is received, the PG module will compute the pattern vector of the frame and, when in detection phase, send the pattern vector to the Database Search Module in the form of a database query. During the registration phase, the PG module calculates the pattern vector in order that it be stored in the database, in correlation with the other relevant information about the known audio or video program. The calculation of the pattern vector is described further below.

Inter-Frame Distance.

For each incremental audio sample, a new frame can be started. That is, each audio sample may be the constituent of N overlapping frames when N is the number of samples in a frame. The distance between these overlapping frames is the inter-frame distance. The shorter inter-frame distance for pattern generation mitigates the problem of program start-time uncertainty. Shorter inter-frame distances produce better results when the start time is unknown. In the preferred embodiment, the value of 4,000, around ¼ of a frame, is used during the audio program registration phase. Other distances may be used either to increase accuracy or reduce compute time and storage overhead. Thus, in the preferred embodiment, the first frame in the database of known audio programs corresponds to audio samples 1 to 16,384, the second corresponds to samples 4001 to 20,384, and so on. During the detection phase, the inter-frame distance is set to be equal to one frame length. Thus, the first frame of the detected audio program contains samples 1 to 16,384, the second frame contains samples 16,385 to 32,768, and so on.

Even though the uses a preferred embodiment setting of sampling rate of 8000 Hz, frame-size of 16384 samples, inter-frame distance of 4000, a different sampling rate may be used with varying results. For example, for a sampling rate of 16000 Hz (double the preferred setting), results in a frame number size of 32768 (double in size but the same in time duration), inter-frame distance of 8000 (inter-frame distance is the same at 0.5 sec) and generates almost identical pattern vectors as when using the preferred settings. The only further change is to determine which Fourier Transform (FFT) coefficients would be included in each sub band used to calculate the pattern vectors. For example, with the preferred settings, (ignoring the speed compensation scheme explained below), band 1 comprises the 66th to 92nd FFT coefficients. Then with the alternate example above, the FFT coefficients will be the 32nd to 94th. The calculation of the pattern vectors, which is presented assuming the sampling rate of 8000 Hz, is adjusted accordingly.

In the case of video, the pattern vectors are derived from the two-dimensional FFT transform of each frame of video. The video frames can be considered analogous to the samples in audio. Thus the vertical and horizontal FFT coefficients can be collected across the video frames to build pattern vectors for each time frame, the time frames constituting a group of video frames. Practitioners of ordinary skill will recognize that the approaches may be combined, in that features of the audio soundtrack of the television program can be combined with features of the video signal of the same program to produce the pattern vectors.

3. Database Search (DBS) Module

Upon the reception of a query generated by the PG module, this module, (3), will search the database containing the sequence of pattern vectors of known programming. If a match is found, then the module returns a set of registration numbers otherwise referred to herein as program-id's and frame-id's, referred to also as frame numbers, corresponding to the identities of a set of audio or video programs and the time frame numbers within these programs where the match occurred. If the search of the database fails to find a match, the DBS Module will issue a NO-MATCHED flag. It is contemplated that aspects of the invention for the DBS Module are applicable to any kind of data set containing signal signatures, even signatures derived using techniques distinct from those used in the Pattern Vector Generation module.

4. Program Detection and Identification (SDI) Module

This module, (4), constantly monitors the matching results from the DBS on the most recent contiguous of N time frames, as further described below. In the preferred embodiment, N is set to five, although a larger or smaller number may be used with varying results. Two schemes are used to determine if any audio or video program has been positively detected. The first is a majority voting scheme which determines if, within each thread of matching pattern vectors among N, the number of frames that possess a valid sequence pass a designated majority of the block of frames. The second is a frame sequencing scheme which follows each of the potential thread and counts how many frames within that thread constitute a valid sequence. If there exists a thread(s) where a majority of the contiguous frames satisfy the frame sequencing requirement, then the program (whether audio or video) is deemed detected in that thread. Either or both schemes are used to suppress false positive detections and to increase the correct detections. In the preferred embodiment, both schemes are used. Given a program (or more than one) that is detected, the SDI module will initiate two modes: 1. Identification mode: in this mode, the module logs all the reference information of the detected program, including title, songwriter, artist, record label, publishing company or any other information input during the registration phase of the system, along with the time when the program is detected, and the time into the program that the detection was made. This information will be registered on the detection log. 2. Tracking mode: In this mode, the module tracks each detected program by monitoring if the queried result of every new frame of the broadcast is obeying the sequencing requirement, described below. The algorithm is locked in this mode until the queried results cannot be matched with the sequencing requirement. Upon the exiting from the tracking mode, a number of detection attributes, including the entire duration of the tracking, and the tracking score, will be logged.

The pattern vector generated by the PG Module is sent to the DBS Module in order to conduct a search of the database for a match. The output is either a NO-MATCHED flag, which indicates that the DBS fails to locate a frame within the database that passes the search criteria; or the program-id's and frame-id's of the library patterns that pass the search criteria.

The SDI Module collects the output from the DBS Module to detect if a new audio program is present. If so, the detected song is identified. FIG. 1 is an illustration of the flow of the algorithm from a frame of audio to its result after detection. With regard to the application of the invention to video, the operation is analogous, once the pattern vectors have been generated. It is contemplated that aspects of the invention for the SDI Module are applicable to any kind of data set containing signal signatures, even signatures derived using techniques distinct from those used in the Pattern Vector Generation module.

Pattern Vector Generation.

The PG module reads in a frame of signal, preferably consisting of 16,384 samples, with sampling rate preferably set at 8,000 samples per second. Thus, the frame length is approximately two seconds in time. More or less samples or frame widths in time may be used with varying results. Given $x=[x_1\ x_2\ \ldots\ x_{16384}]$, the vector containing a frame of signal, where each $x_i$ is the value of the nth audio sample, an N element pattern vector is calculated with the following steps. In the preferred embodiment, N is equal to 31. Practitioners of ordinary skill will recognize that the value of N is arbitrary, and can be increased or decreased with varying results. For example, decreasing N reduces the compute time and memory requirements, but may reduce accuracy. Increasing N may do the opposite. Also, the method presented will assume that a 31 element pattern vector is being used in the calculation in order to simplify the presentation of the invention. Practitioners of ordinary skill will recognize that the same methodology will work when N is increased or decreased, depending on whether the goal is increased accuracy or reduced computer complexity.

1. The Fourier transform of x is calculated with the number of points equal to the number of samples in the frame, in order to get the spectrum vector $$X=[X_1\ X_2\ \ldots\ X_{16384}].$$

The spectral resolution of the transform is

The spectral resolution of the transform is =

$$\frac{8000\ \text{samples/sec}}{16{,}384\ \text{samples}} = 0.488\ \text{Hz}$$

Segregate the FFT spectral values into frequency bands of a specified width, where in the preferred embodiment, the width is 64 Hz. The invention will be further explained in terms of the preferred embodiment in order to simplify the presentation, but without limitation to the extent of the invention claimed.

Band #1 is from 0 to 64 Hz, Band #1 encompasses FFT coefficients $X_1$ to $X_{131}$ Band #2 is from 64 to 128 Hz, Band #2 encompasses $X_{132}$ to $X_{262}$, and so on.

2. Compute the centroid (or center-of-gravity COG) of each band:

$$p_k = \frac{\sum_{m=1}^{131} m \times X_{131k+m}}{\sum_{m=1}^{131} X_{131k+m}}$$

In the preferred embodiment, only Band 2 to 32 is used because Band 1 is the lowest band including zero Hz, which is normally not useful in FM radio transmission; and Band 32 covers the band up to 1,800 Hz, which is typically sufficient bandwidth to encode a fingerprint of the audio. Of course, higher bands or lower bands can be used if required. The inclusion of higher or lower bands to account for signal characteristics can be determined empirically. The first step, where the FFT coefficients are collected in order to calculate the centroid in step 2 is different in the case of video. In the video case, the FFT coefficients have to be selected from locations either in the complex plane or on the 2-dimensional spatial frequency plane as described on page 23 of Poynton, incorporated herein by reference. These locations are analogous to the frequency bands on the audio case. In a manner analogous to using predetermine frequency bands in audio, predetermined regions on the vertical/horizontal plane in the frequency domain can be defined and the FFT coefficient values in each regions used to calculate an element corresponding to that region. Once this selection is made, the centroid can be calculated in an equivalent manner. It is advantageous to ignore the frequency region encompassing the frame rate, sync rate, subcarrier, or line rate. The end result is essentially equivalent to the case of audio: that each time frame of video will have a pattern vector associated with it that is stored in a database.

After Step 3, a 31-element vector is obtained: $c=[p_2\ p_3\ \ldots\ p_{32}]=[c_1\ c_2\ \ldots\ c_{31}]$. In the preferred embodiment, a further step converts c to an unsigned integer. The unsigned format is used because all the elements in c are positive in the interval of (1, 131). A further calculation on c normalizes each element to a value between 0 and 1 by exercising the division by 131, the number of FFT components within each band:

$$0 \leq c_i = \frac{c_i}{131} \leq 1$$

Figure 3:
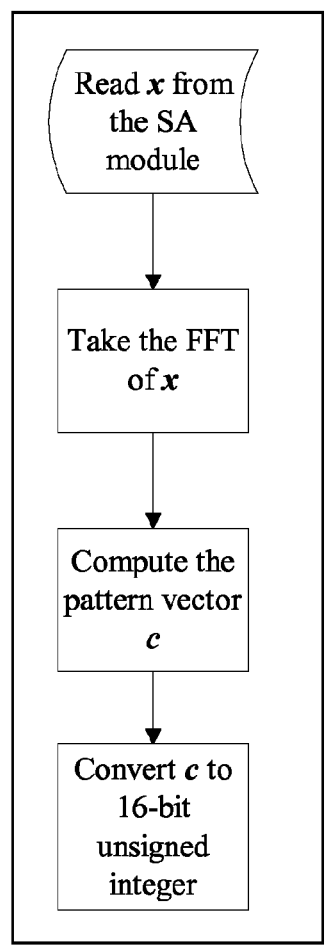
FIG. 3: The flowchart of the Pattern Generation Module.

In the preferred embodiment, each element is then converted to the unsigned 16-bit integer format for convenient storage and further processing. In order to decrease the compute time downstream, each FFT coefficient or $c_i$, is tested relative to a minimum threshold value. The downstream processes are set to ignore these elements, for example, by not including these elements in downstream sets that are collected for further calculation. FIG. 3 shows a flowchart of this module. In the preferred embodiment, both the FFT in step 1 and the centroid (COG) computation in step 3 are typically calculated using double precision floating point instructions.

Speed Compensation Scheme

Practitioners of ordinary skill in the art will recognize that for a variety of reasons, broadcast programming is often sped up from the speed of the original programming. Therefore, it is critical that any automatic audio program detection system be robust when the detected audio program may differ from the speed of the audio provided during the registration phase. In order to alleviate this problem, a modification to the pattern vector generating formula is used:

(a) The modification is to have a different number of FFT components (i.e. bandwidth) of each band in step 2.

(b) In the preferred embodiment, the modification to the pattern vector generation formula is only applied to the incoming broadcast audio signal during the detection phase, not to the pattern generation process applied during the registration phase of the audio program. Practitioners of ordinary skill will recognize that the use of the alternative frequency bands described above for the detection phase can alternately be performed during the registration phase with substantially the same result.

The specific detail of this modification is described below:

The formulation is based on the scaling property of the Fourier Transform.

A time speed up version of a song is a time-scaled version of the original:

$$x(t) \xrightarrow{speedup} x(at);$$

$a>1$ where a is the rate of speedup and $x(t)$ is the detected sample at time t. Note that for $a>1$, the time axis is "compressed". If the song is sped up by 2%, we have $a=1.02$.

With the scaling property, the factor a can be used to adjust the values of the Fourier Transform:

$$x(t) \xleftarrow{Fourier\ Transform} X(f)$$
$$x(at) \xleftarrow{Fourier\ Transform} X(f/a)$$

Thus, the spectrum of a fast playback, or speedup version of a song is stretched. With a 2% speedup rate, the Fourier Transform frequency component at 100 Hz without any song speedup, is shifted to 102 Hz after speedup. This implies that, if there exists a 2% speedup rate in the detected song, the bandwidth in step 2 should be adjusted accordingly to 1.02× 64 Hz=65.28 Hz, and hence the number of FFT components within each band should be adjusted to the roundoff of 131× 1.02, which is equal to 134. There are two formulae to calculate the amount of FFT components in each band, both based on the original number of FFT components, which is equal to 131.

Formula (1) Given the speedup rate r.
Start at Band #1, which encompasses FFT coefficients $X_1$ to $X_{z(1)}$, where $z(\mathbf{1})$=roundoff of 131×(1+r).

(2) Compute iteratively each $z(k)$=roundoff of $[z(k-1)+ 131\times(1+r)]$ for k=2 to 32. Band #m consists of FFT coefficients of $X_{z(m-1)+1}$ to $X_{z(m)}$.

(3) Compute the centroids (COG) from Band #2 to #32 with the new band partitions calculated above. Exercise the normalization by dividing each centroid (COG) by the number of FFT components in the corresponding band.

Figure 4:
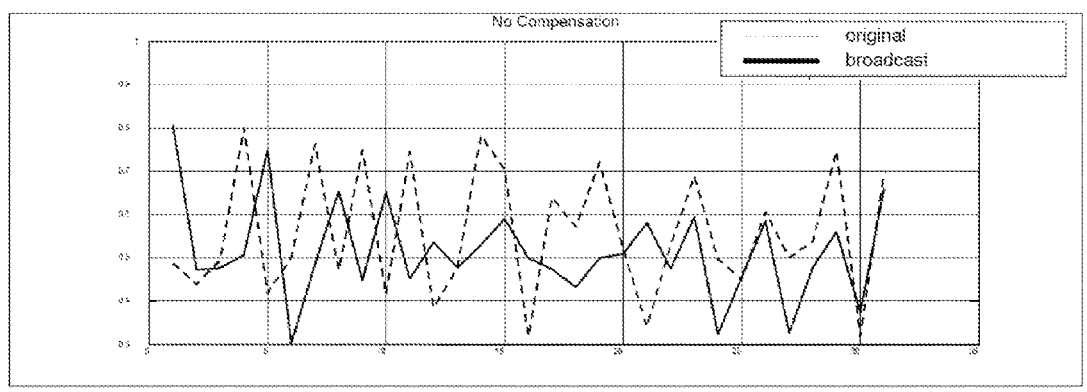
FIG. 4: Example of how original frequency band boundaries lead to pattern mismatches between the original frame signatures and the signatures of the same audio program played at a faster speed.
Figure 5:
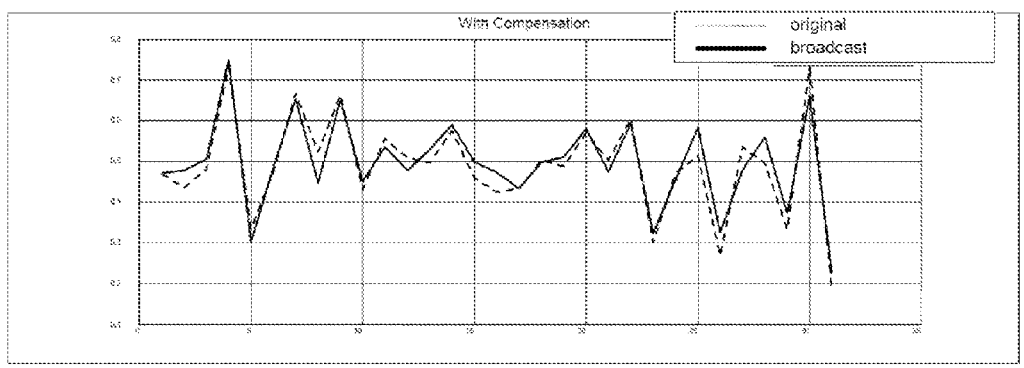
FIG. 5: Example of how changing the frequency band boundaries yields an improved match between frame signatures of the original audio program and the same audio program played back at fast and slow speeds.

The difference with and without the compensation is shown in FIGS. 4 and 5. FIG. 4 shows Original band setting leads to pattern mismatches between the original and its speedup variant. FIG. 5 shows that the modified band setting yields very good pattern matching behavior given that the speedup rate is known.

Robust Pattern Vector Generation Formula

The pattern vector generation formula described above can be further refined in order to provide robust matching. This refinement may also be used instead of the prior formulation. Besides causing the frequency axis to stretch, another effect of speedup is the shift of the boundaries in frequency of every band. The refinement is to compensate the shift of the boundaries of a band by extending the width of the band, such that the amount of the shift due to playback speed is within a small percentage compared with the band width. Thus, there is no modification of the algorithm—that is, calculating centroids as pattern vectors—except that the band locations are changed. The modified band boundaries are used during the registration process to create the stored pattern vectors. Practitioners of ordinary skill will recognize that several alternative methods may be used to calculate frequency band widths that exhibit the same property, that is, extending the band width such that the frequency shift due to playback speed variation is comparatively small, where the percentage frequency shift due to playback speed changes is a small percentage of each frequency band width. Further, it is contemplated that this technique will work for any method of calculating a signature in the signal that is based on segregating the FFT coefficients into frequency bands. One method to calculate modified band boundaries that exhibit this effect is described below as the preferred embodiment.

Algorithm to Compute New Band Boundary Locations:

Let the starting and ending indexes of band number k in the frequency domain be $s_{k,1}$ and $s_{k,2}$ respectively, that is the index of the FFT coefficients. For example, index $s_{1,1}$ is equal to 1 and corresponds to the first FFT coefficient for 0 Hz. A shift-to-bandwidth ratio is assumed, which is the expected maximum speedup in percent divided by the percentage of bandwidth that the shift should not exceed. In the preferred embodiment, that value is assumed to be 5%, but other values may be used in order to increase accuracy or reduce compute complexity.

1. Start from band k=1, whose starting location $s_{1,1}$=1. Assuming a 2% speedup, the location is shifted by 0.02 to 1.02, which after roundoff is still equal to 1. Roundoff is necessary because the result indices must be integers. Assuming the shift-to-bandwidth ratio to be equal to 0.4 (which is 2% shift divided by 5% bandwidth, the amount that shift should represent) of the bandwidth of Band #1, then the ending location $s_{1,2}$=(1+0.02/0.05)×$s_{1,1}$=1.4, or 1 after round-off.
2. Now proceed to compute the two locations for Band #2. The starting location $s_{2,1}$=2. Given 2% shift and 5% shift-to-bandwidth ratio, we obtain $s_{2,2}$=3.
3. Continue the iteration until all the FFT components are exhausted. In the preferred embodiment, the result (both lower order bands, $s_{k,1}$<64, corresponding to 31.25 Hz, and higher order bands, $s_{k,1}$>5500, corresponding to 2,686 Hz, are not used.
4. When k equals 9, then $s_{9,2}$=66, and when k=10, $s_{10,1}$=67 and so on.
In order to avoid overflow because the bandwidth of each band along k increases exponentially with k, the preferred embodiment has set arbitrarily $s_{10,1}$=66, so that as k iterates to k=22, $S_{22,2}$=5298. Table 1 shows the tabulation of the result
5. The number of entries at this point is only 13, but a total of 31 entries are preferred, where each entry corresponds to a particular element in the pattern vector.

The second batch of bands are obtained by taking the middle of each of the bands obtained in step 3. An additional 12 bands are obtained, as shows in Table 2:
6. At this point there are 25 bands. The remaining six bands are obtained by combining bands from the two tables. In particular, entries 1 and 2 are merged, entries 3 and 4 are merged, and entries 5 and 6 are merged in both tables to creates six more entries, as shown in Table 3:

Combining the above, the starting and the ending locations of the 31 bands are presented in Table 4.

Figure 6:
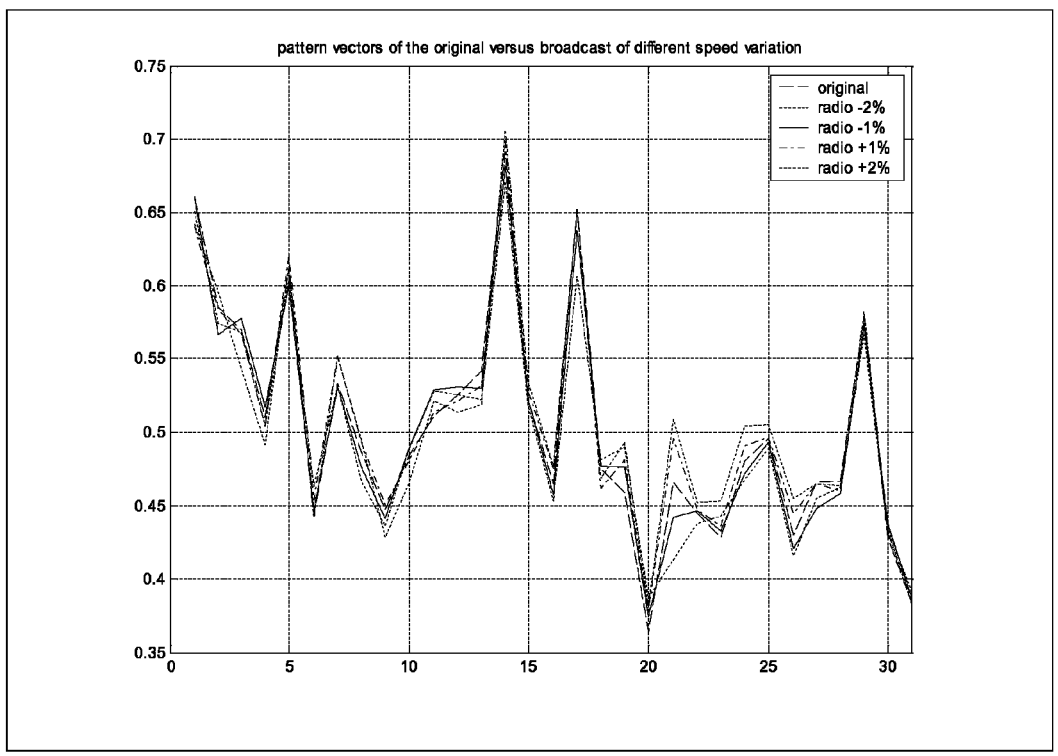
FIG. 6: The new frequency band boundary setting leads to robustness of the audio detection algorithm even with +/−2% speed variations in the audio program.

A test result on a frame of signal is shown in FIG. 6 to demonstrate the robustness for speed changes of +/−2%.

Combination of Speedup Compensation and Robust Formula

The two methods described above for adjusting frequency band boundaries can be combined if speedup compensation is also incorporated. The relationship between speedup and the expansion of the frequency spectrum is exploited to combine the two approaches. The k-th subband, starting and the ending location=[$s_{k,1}$, $s_{k,2}$], has a robustness to speed change of +/−2%. Each value is then multiplied by (1+r), where r is the amount of speedup to [$s_{k,1}$, $s_{k,2}$], followed by the roundoff method described above. This results in new indices [$\hat{S}_{k,1}, \hat{S}_{k,2}$] whose robustness to speed change is shifted to r+/−2%. Essentially, the new table is the prior Table 4, where the values are multiplied by (1+2%) and then the same roundoff method applied. Table 4 is now used during the registration phase to create pattern vectors from the known audio program that populates the database library. Table 5 is used during the detection phase to create the pattern vector from the detected incoming broadcast that is used in the DBS module to find matching data records in the database as described further below. Thus, both methods are combined. By way of example, setting r=0.02 (2%), and processing every band in Table 4, a new set of subbands is calculated which is robust to speed change of 0 to 4%, as shown in Table 5.

Table 5 is obtained with 2% speedup compensation. The new 31 pairs of starting and ending locations after 2% speedup compensation added to that tabulated in Table 4. This result is from processing the detected song from the broadcast.

The compensation effectively positions the method to have the robustness from 0 to 4% speedup variations. Practitioners of ordinary skill will recognize that the same approach can be used to mitigate the effects of variation in the speed where the variation ranges above and below zero, that is, slowing down or speeding up the playback.

Database Search (DBS) Module

The Database Search Module takes the pattern vector of each frame from the PG Module and assembles a database query in order to match that pattern vector with database records that have the same pattern vector. A soft matching scheme is employed to determine matches between database queries and pattern vectors stored in the database. In contrast, a hard matching scheme allows at most one matching entry for each query. The soft matching scheme allows more than one matching entries per query, where a match is where a pattern vector is close enough, in the sense of meeting an error threshold, to the query vector. The number of the matching entries can either be (i). limited to some maximum amount, or (ii) limited by the maximum permissible error between the query and the database entires. Either approach may be used. The soft matching scheme relies on the fact that the program patterns are being oversampled in the registration phase. For example, in the preferred embodiment the interframe distance used for registration is only ¼ of that used in the detection. Thus it is expected that if the m-th frame of a particular program is the best matching frame to the query, then its adjacent frames, such as (m−1)th frame and (m+1)th frame, will also be good matches. The combined effort of soft matching and sequencing schemes enhance the robustness of the detection system to varying signal condition inherent in the broadcasting environment.

Figure 7:
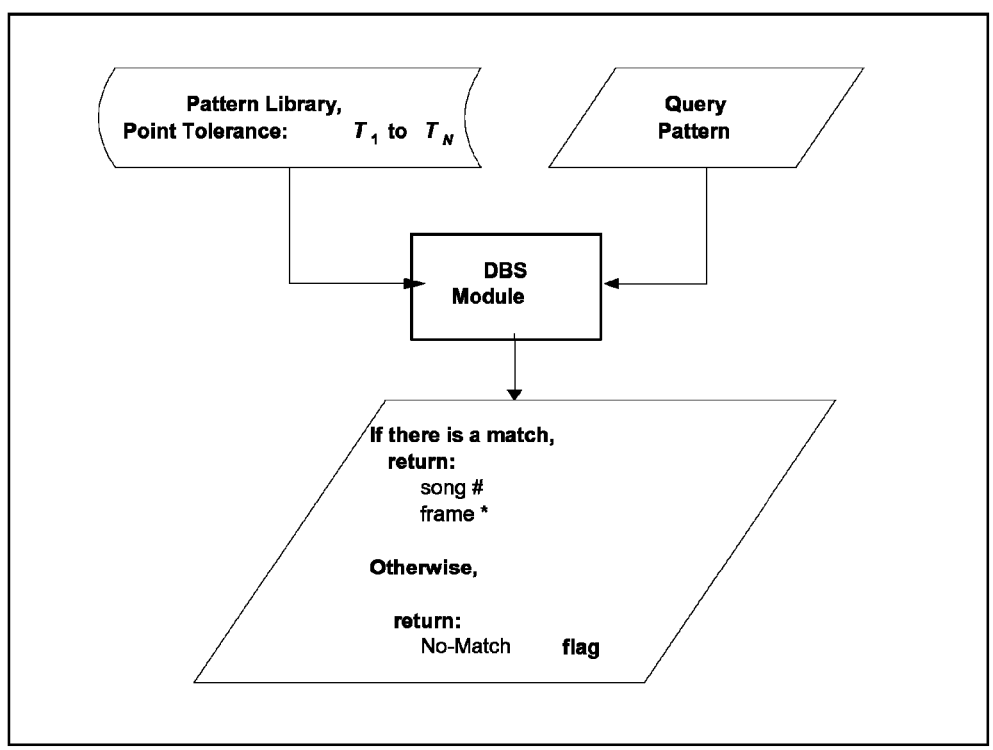
FIG. 7: The schematic of the DBS operation flow.

When matches are found, the corresponding program-id numbers and frame numbers in the data record is returned. The flowchart in FIG. 7 illustrates the flow in DBS Module. Practitioners of ordinary skill in the art will recognize that a search across a variable to find the location of variables that match within a given tolerance in a very large database is potentially time consuming, if done in a brute force manner. In order to address the compute time problem, a two part search is employed. In Part 1, a range search scheme select those entries within a close vicinity to the query. In Part 2 a refined search over potential candidates from Part 1 is used to select the set of candidates which are the closest neighbors to the query.

The Steps are Described in Detail Below:

1. Assemble the query from the pattern vector generated by the PG Module during the detection phase.
2. Execute a nearest neighbor search algorithm, which consists of two parts. Part 1 exercises an approximate search methodology. In particular, a range search (RS) scheme is employed to determine which entries in the database falls within a close vicinity to the query. Part 2 exercises a fine search methodology. Results from Part 1 are sorted according to their distances to the query. The search algorithm can either (i) return the best M results (in terms of having shortest distances to the query), or (ii) return all the results with distance less than some prescribed threshold. Either approach may be used. As further described below, the nearest neighbor algorithm can be replaced with other algorithms that provide better compute time performance when executing the search.
3. If there is a match, output the program-id number and the corresponding frame number. If there are multiple matches, output all program-id's and corresponding frame numbers.

If there is no match, output the NOMATCH flag.

Range search requires pattern vectors that match within a tolerance, not necessarily a perfect match in each case. From the geometrical point of view, range search identifies which set of the entries encompassed within a polygon where the dimensions are determined by the tolerance parameters. In the preferred embodiment, the polygon is a 31 dimensional hyper-cube.

Range Search (RS) Formulation

In the preferred embodiment, the pattern vector is a 1×31 vector: $c=[c_1 \, c_2 \ldots c_{31}]$, where c is the pattern vector detected where a match is sought. The number of bands, as described above, may be more or less than 31, with varying results, trading off increased accuracy for compute complexity. The search algorithms will be described using a 31 element vector, but practitioners of ordinary skill will recognize that these methods will apply with any size pattern vector. The pattern library is a M×31 matrix, where M is the total number of pattern vectors stored in the database and 31 represents the number of elements in the pattern vector. M is a potentially huge number, as demonstrated below. Assume that the entire database is represented by the matrix A:

$$A = \begin{bmatrix} z_1 \\ z_2 \\ \vdots \\ z_M \end{bmatrix} = \begin{bmatrix} z_{1,1} & z_{1,2} & \cdots & z_{1,31} \\ z_{2,1} & z_{2,2} & \cdots & z_{2,31} \\ \vdots & \vdots & \ddots & \vdots \\ z_{M,1} & z_{M,2} & \cdots & z_{M,31} \end{bmatrix}$$

Those pattern vectors stored in the library are referred to as the library pattern vector. In the preferred embodiment, each vector z is a pattern vector of 31 elements calculated during the registration phase with known audio content for which detection is sought during the detection phase. During the detection phase, the identification exercise is to locate a set of library pattern vectors, {z_opt}, which are being enclosed within the hypercube determined by the tolerance parameter.

The search criteris can be represented as the identification of any z* such that $$z^* = \min_{m=1 \, to \, M} \|z_m - c\|$$

In the preferred embodiment, L1 norm is used, where $\|x\|=|x_1|+|x_2|+ \ldots +|x_{31}|$ is the L1 norm of x. Thus $$\|z_m - c\| = \frac{|z_{m,1} - c_1|}{e_{m,1}} + \frac{|z_{m,2} - c_2|}{e_{m,2}} + \ldots + \frac{|z_{m,31} - c_{31}|}{e_{m,31}}$$

Here, $e_{m,n}$ is referred to as the nth point error between the c and $Z_m$.

The search for z* over the entire library with the RS algorithm is based on the satisfaction of point error criteria. That is, each point error must be less than some tolerance and, in the preferred embodiment, the L1 norm less than a certain amount. Practitioners of ordinary skill will recognize that the tolerance for each element and the L1 norm may be the same or different, which changes the efficiency of searching.

The determination of the tolerance is based on some statistical measure of empirically measured errors. Further, it is recognized that other measures of error, besides a first-order L1 norm may be used. The search problem now becomes a range search problem, which is described elsewhere in the art. Reference is made to P. K. Agarwal, Range Search, in J. E. Goodman and J. O'Rourke, editors, *HANDBOOK OF DISCRETE AND COMPUTATIONAL GEOMETRY*, page 575-598, Boca Raton, N.Y., 1997, CRC Press. C++ codes are also available from: Steve Skiena, *The Algorithm Design Manual*, published by Telos Pr, 1997, ISBN: 0387948600

Following are the steps in the method to determine z*:

1) Set L equal to the index set containing all the indices of library pattern vectors:

$$L=\{1,2,3,\ldots,M\}$$

2) Start with n=1.
3) Compute $e_{m,n}$ between the nth element of c to the nth element of each $z_{m,n}$ where m ranges from 1 to M.
4) Update L to include only those indices of pattern vectors whose nth point error is smaller than the specified tolerance $T_n$:

$$L = \begin{Bmatrix} 1 \le m \le M, \\ \text{where} \\ e_{m,k} < T_k, 1 \le k \le n \end{Bmatrix}$$

$T_n$ can be set arbitrarily. In the preferred embodiment $T_n$, is set to be 10% of the value of $c_n$.

5) If L is now an empty set AND $n \le 31$,
Exit and issue the NO-MATCH FLAG.
Else: Set n=n+1.
If n>31, Go to step 6.
Else: Go to step 3.
6) Compute the error between all pattern vectors addressed in L to c:

$$e_m = \|z_m - c\|; m \in L$$

The best solution is determined by examining all of the $e_m$, and that will result with $z^*$. Alternatively, for soft matching purposes, either of the two criteria can be used.
Criteria 1: select only those $z_m$ with error less than some prescribed threshold $e_{max}$.
Criteria 2: select the best M candidates from L, where the M candidates are the least size of error to the Mth size of error.

Once the index m with the best L1 match is determined, the index is used to recover the data record corresponding to the pattern vector $z_m$. The database module then outputs the program-id and the corresponding frame number as the output.

Note that at the start of the nth iteration, the index set L contains the indices of library pattern vectors whose point error from m=1 to n−1 passes the tolerance test. At the start of the nth iteration, the index set L is:

$$L = \begin{Bmatrix} 1 \le m \le M, \\ \text{where} \\ e_{m,k} < T_k, k = 1 \text{ to } n-1 \end{Bmatrix}$$

Figure 8:
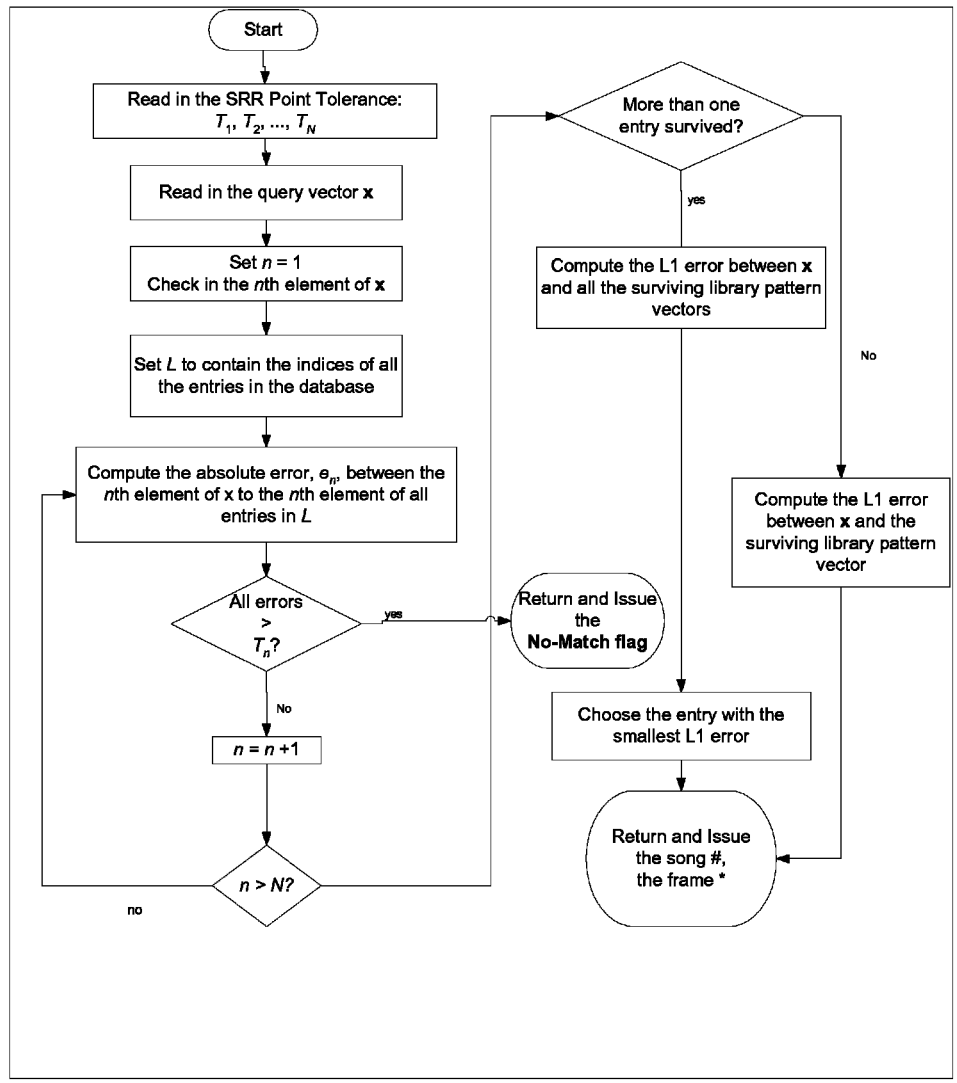
FIG. 8: The flowchart of the SRR Algorithm.

The flowchart of the RS algorithm is shown in FIG. 8.

It is anticipated that the library size for application of the invention to audio programming, M, for 30,000 songs is in the order tens of millions. The following shows the calculation:

| | |
|---|---|
| Number of songs = | 30,000 |
| Typical Song Length = | 204 seconds (3 min 24 sec) |
| Sampling Rate = | 8,000 samples per second |
| Frame Size = | 16,384 samples |
| Inter-Frame Distance = | 4,000 samples |

The number of frames per song is the song length times the number of samples per second minus the frame size, all divided by the inter-frame distance. In the preferred

| | |
|---|---|
| embodiment, there are about = | 404 frames |
| With 30,000 songs, M = | 12,117,120. |

With this figure, the first iteration requires around 12 million subtractions and branch statement executions to update the index set L. The next iteration will probably be less, but still in the order of millions. Also, memory must be allocated to hold the intermediate values of all of the subtraction results required for the tolerance test.

Fast Range Search Algorithm

There is an improvement to the method that minimizes the amount of subtractions that must be performed in order to find $z^*$. And more importantly, the execution time does not scale up as fast as the size of the database, which is especially important for database of this size. This performance enhancement is achieved at the cost of using a larger amount of memory. However, practitioners of ordinary skill will recognize that because computer memory costs have historically been reduced continuously, this is now a reasonable trade-off. The modification to the RS algorithm is to use indexing rather than computing exact error values. This modification is further explained below.

The improved search methodology for recovering the best match between a detected pattern vector and pattern vectors held in the database is referred to here as the Fast Range Search Algorithm. As before, A is the library matrix consisting of M rows of pattern vectors:

$$A = \begin{bmatrix} z_1 \\ z_2 \\ \vdots \\ z_M \end{bmatrix} = \begin{bmatrix} z_{1,1} & z_{1,2} & \cdots & z_{1,31} \\ z_{2,1} & z_{2,2} & \cdots & z_{2,31} \\ \vdots & \vdots & \ddots & \vdots \\ z_{M,1} & z_{M,2} & \cdots & z_{M,31} \end{bmatrix}$$

Each row is a particular pattern vector. There are in total M pattern vectors, and in the preferred embodiment, each has 31 elements.

Steps

1. Segregate each individual column of A:

$$\begin{bmatrix} z_{1,1} & z_{1,2} & \cdots & z_{1,31} \\ z_{2,1} & z_{2,2} & \cdots & z_{2,31} \\ \vdots & \vdots & \ddots & \vdots \\ z_{M,1} & z_{M,2} & \cdots & z_{M,31} \end{bmatrix} \xrightarrow{\text{Segregate the columns}} \begin{bmatrix} z_{1,1} \\ z_{2,1} \\ \vdots \\ z_{M,1} \end{bmatrix}, \begin{bmatrix} z_{1,2} \\ z_{2,2} \\ \vdots \\ z_{M,2} \end{bmatrix}, \ldots, \begin{bmatrix} z_{1,31} \\ z_{2,31} \\ \vdots \\ z_{M,31} \end{bmatrix}$$

2. Each of the elements in the columns are sorted in an ascending order $$\begin{bmatrix} z_{1,k} \\ z_{2,k} \\ \vdots \\ z_{M,k} \end{bmatrix} \xrightarrow{\text{Sort in Ascending order}} \begin{bmatrix} \hat{z}_{1,k} \\ \hat{z}_{2,k} \\ \vdots \\ \hat{z}_{M,k} \end{bmatrix}; \hat{z}_{1,k} \le \hat{z}_{2,k} \le \ldots \le \hat{z}_{M,k}; k = 1 \text{ to } 31$$

3. As a result of the sort, each element $z_{m,k}$ is mapped to $\hat{z}_{\hat{m},k}$. Two cross indexing tables are constructed: Table $R_k$ is a mapping of $m \rightarrow \hat{m}$ and table $T_k$ maps $\hat{m} \rightarrow m$, for every k=1 to 31.

The practitioner of ordinary skill will recognize that the sorting and table creation may occur after the registration phase but prior to the search for any matches during the detection phase. By having pre-sorted the pattern vectors during the registration phase, the system reduces the search time during the detection phase. During the detection phase, the method begins with a search through the sorted vectors, as described below.

Index Search

Given the query vector $c = [c_1 \; c_2 \ldots c_{31}]$ and the tolerance vector $T = [T_1 \; T_2 \ldots T_{31}]$, a binary search method may be used to extract the indices of those elements that fall within the tolerance. Other search methods may be used as well, but the binary search, which performs in log(M) time, is preferred.

Steps:
1. Set k=1.
2. Exercise binary search to locate in the sorted column k: $\hat{z}_{\hat{m},k}$, $\hat{m}$=1 to M, the element $\hat{z}_{\hat{m}_L^k,k}$ closest and more-than-or-equal-to $c_k-T_k$. Then exercise binary search again to locate the element $\hat{z}_{\hat{m}_U^k,k}$ closest and less-than-or-equal-to $c_k+T_k$. Thus, all the elements in the set $\{\hat{z}_{\hat{m},k}, \hat{m}_L^k \leq \hat{m} \leq \hat{m}_U^k\}$ satisfy the tolerance requirement in this manner, the binary search is used twice in every kth column to locate $\hat{m}_L^k$ and $\hat{m}_U^k$.

Further, let $\wp_k$ be the index set containing the indices of all $\hat{z}_{\hat{m},k}$ that satisfy the tolerance requirement:

$$\wp_k = \{\hat{m}_L^k \leq \hat{m} \leq \hat{m}_U^k\}$$

3. k=k+1. if k>31, go to next step.

Alternatively, the process can calculate which columns have the least number of bands that pass the test, and to start with that number of bands in next step. By advancing up the sorted k values where the corresponding number of bands goes from smallest to largest, the result can converge faster than simple increment iteration over k.

4. Repeat steps 2 and 3 until k=32 in order to obtain every pair of bounds: $\{\hat{m}_U^k\}$, k=1 to 31, and thus determine the 31 $\wp_k$'s.
   Each $P_k$ is obtained independently. For every k, all the indices enclosed within the pair $\{\hat{m}_L^k, \hat{m}_U^k\}$, k=1 to 31 can be converted back to the original indices using $T_k$. Then, an intersection operation is run on the 31 sets of indices.
   An alternate way is to intersect the first two set of indices, the result is then intersected with the $3^{rd}$ set of indices, and so on, until the last set of indices have been intersected. This is the approached outlined below:
5. Reset k=1.
6. Retrieve all indices in $\wp_k$ and store into the array R.
7. Use Table $T_k$ to convert all indices in R to the original indices:

$$\hat{m} \xrightarrow{T_k} m$$

Store all the indices m into a set S.
Use Table $R_{k+1}$ to convert m to $\hat{m}$: (thus the indices represented in column 1 are translated into their representation in column 2). Then to the results are tested to see if they are within the bound of $\{\hat{m}_L^{k+1}, \hat{m}_U^{k+1}\}$.

$$m \xrightarrow{R_{k+1}} \hat{m}$$

Apply the tolerance test and generate $$R = \{\hat{m}, \hat{m}_L^{k+1} \leq \hat{m} \leq \hat{m}_U^{k+1}\}$$

In this manner, each successive $\wp_k$ would be the prior $\wp_k$ minus those indices that failed the tolerance test for the kth element. Thus, when k=30 in step 6, the $\wp_{30}$ are the indices that meet all 31 tolerance tests.

8. k=k+1.
9. Go to Step 6 and loop until k=31.
10. Here, the set S are all the original indices after the 31 intersection loops. If S is empty, issue the NO-MATCH flag. Otherwise, for hard matching, we proceed to locate the sole winner which may be the closest candidate, for example. For soft matching, we proceed to obtain all the qualifying entries.

Further Speed Enhancements to the Fast RS Algorithm

Starting from step 4, instead of starting from k=1, then k=2, then k=3 ..., to the end, the total number of candidates in each column can be measured. The total number of candidates in each column is equal to the total number of candidates in each $\wp_k$. The order of k's can then be altered so that the first k tested is where $\wp_k$ has the fewest candidates, and so on until all k's are tested. Then the order of intersection starts with columns with the least number of candidates. The end result is the same as intersecting the same set of 31 indices with k incrementing sequentially, but by ascending the reordered k's, the number of intersecting operations, is reduced and thus speeds up the search.

Search Booster:

Practitioners of ordinary skill will recognize that the current search methodologies generally are searching on a frequency band by frequency band basis. Empirical studies using the preferred embodiment indicate that the initial iteration of the search results in 60% to 90% of the entries in the database passing the filter for that frequency band. Assuming a database of 6,000 song titles with 300 entries per song, the total number of entries to be searched is 1,800,000. With a 60% return, the system has to deal with more than a million entries after the first intersection. The number of iterations necessary to converge on the single search result can be reduced if the size of the initial intersection is smaller. It is another object of the invention, referred to here as the booster, to pre-process the search in such a way as to reduce the number of search results in the beginning iteration of the process.

The booster uses a different indexing scheme such that more than one frequency band can be lumped together. By means of the booster, a single search loop in the booster is equivalent to multiple loops in the range search method, and hence the search speed improved. A ranking scheme is used to determine the order of the search so as to minimize the number of searches for intersecting indices. To establish this ranking, the maximum, mean and standard-deviation of the return percentile in each of the bands is computed during the normal range search process. These empirical results are used to choose which bands will be lumped together using the booster process.

The booster indexing scheme is an extension of a binary-to-decimal conversion, where a vector of binary-value elements is converted to a decimal integer. The extension is straightforward. In particular, if the base of a vector $\vec{x}$, of size N, is M, where M is an integer, the conversion formula is as follows:

$$\vec{x} = \lfloor x_1 \ x_2 \ \ldots \ x_N \rfloor; 0 \leq x_k \leq M-1$$

$$\boxed{d_{\vec{x}} = \sum_{n=1}^{M} x_n M^{n-1}} \quad \text{Eqn (1)}$$

Note that the conversion by Equation 1 is reversible, that is the equation may be used to convert $d_{\vec{x}}$ to $\vec{x}$. Thus, the conversion possesses the one-to-one relationship so that every unique integer $d_{\vec{x}}$ is calculated from a unique $\vec{x}$. In the preferred embodiment, the database that houses the pattern vectors, each of the pattern element is stored as a 16-bit unsigned integer. This implies that each pattern vector can be considered as a code vector, with M=65536 and N=31, and a unique $d_{\vec{x}}$ can be calculated for each pattern vector. As a result of this conversion the multi-dimensional space of the pattern vectors are mapped to a one-dimensional space. The search for pattern vectors that are within the required distance from the query vector $\vec{y}=[y_1, y_2, \ldots, y_n]$, referred to elsewhere as the tolerance requirement and here as the gap requirement, is to locate all entries $\vec{x}=[x_1, x_2, \ldots, x_n]$ in the database such that the gap requirement $|x_k-y_k|\leq Q; k=1\ldots 31$ is satisfied. In the preferred embodiment, where the coding is 16 bits, the tolerance $T_k$ is 10% of the range of the 16 bits so that Q=10%=64K=6554. In practice, the value 6,000 is used.

The booster maps the gap requirement in each band (referred to elsewhere as the tolerance requirement) to the corresponding gap requirement in $d_{\vec{x}}$. Although the search can then iteratively single out all entries that satisfies all the gap requirements, the major difficulty of this approach is that the multiple gap requirements result in multiple disjoint segments on $d_{\vec{x}}$. In particular, 31 iterations are required for the identification of the qualifying entries in $d_{\vec{x}}$ where $\vec{x}$ is converted to $d_{\vec{x}}$, and the first loop is for band 1, the 31 st loop is for band 31. Practitioners of ordinary skill will recognize that by changing the number of bands in the pattern vector, the number of iterations would change, but the substance of the approach would be the same.

To circumvent the technical difficulty, two compromises is made: First, only a subset of frequency bands are selected to be included in the booster, i.e., only those indices in the subset are coded using Equation 1. Second, a smaller base is used. The first compromise reduces the number of iterative loops, or specifically, the number of disjoint segments, so searching over every segment is practical in terms of CPU speed. The second compromise cuts down the memory requirement, and, more importantly, it allows for hard coding the search result of the booster (with just a marginal amount of RAM) to make the search within the booster very fast.

The process for the preferred embodiment is described in detail below:

1. Set the base N=31.
2. Choose 3 out of the 31 bands. More or fewer bands could be chosen. However if a large number of bands are chosen relative to the number M, then the booster method becomes slower and its usefulness more limited. If too few, its not accurate enough and does not speed up either, so an optimal number is empirically determined. In the preferred embodiment, where N=31, 3 out of the 31 are chosen. 3. This combination results in:
  (a) that the dynamic range of the new index is from 0 to 32767. Thus each new index can be coded in 2 bytes.
  (b) Hard-coding of the search results: Create 32768 bins: bin 0 to bin 32767. Bin m holds the indices of all library pattern vectors whose 3-band elements result in the value m after the conversion.
4. Search Methodology:
  (a) Given a query vector $\vec{y}=[y_1, y_2, \ldots, y_n]$
  (b) Single out the elements in the three specified bands.
  (c) Convert the query vector using those three bands to a number using Equation 1.
  (d) Collect all the indices of the library vectors that fulfill the gap requirement in the three specified bands by looking for the closest match of values m between the converted query and the converted library pattern vectors.
  (e) Pass the indices in (d) to the output and resume the band-by-band search described above on those sets of indices.

Practitioners of ordinary skill will recognize that the conversion of the library pattern vectors using Equation 1 may be made prior to operation, so that the run-time computation load is reduced.

D. Song Detection and Identification (SDI) Module.

The SDI module takes the results of the DBS module and then provide final confirmation of the audio or video program identity. The SDI module contains two routines:

1. Detection—Filtering on Regularity of the Detected Song Number:

Irregular matches, where the DBS module returns different program-id numbers on a consecutive set of frames, is a good indication that no program is being positively detected. In contrast, consistent returns, where the DBS module returns consistently the same song number on a consecutive set of frames, indicates that a program is successfully detected.

A simple algorithm based on the "majority vote rule" is used to suppress irregularity returns while detecting consistent returns. Assume that the DBS module outputs a particular program-id and frame-id for the ith frame of the detected program or song. Due to irregular returns, the result program-id will not initially be considered as a valid program identification in that frame. Instead, the system considers results on adjacent frames (that is, non-overlapping frames) of i, i+1, i+2, ..., i+2K, where in the preferred embodiment, K is set to between 2 and 4. If there is no majority winner in these (2K+1) frames, the system will issue song number=0 to indicate null detection in the ith frame. If there is a winner, i.e. that at least (K+1) frames that are contiguous to frame i produced the same program-id number, the system will issue for the ith frame the detected song number as such majority winning program-id number. Practitioners of ordinary skill will recognize that a majority vote calculation can be made in a number of ways, for example, it may be advantageous in certain applications to apply a stronger test, where the majority threshold is a value greater than K+1 and less than or equal to 2K+1, where a threshold of 2K+1 would constitute a unanimous vote. This reduces false positives at potentially the cost of more undetected results. For the purposes here, majority vote shall be defined to include these alternative thresholds. For computation speed, the preferred embodiment determines the majority vote using a median filter. A median on an array of 2K+1 numbers, $Z=[z_1\ z_2 \ldots z_{2K+1}]$, K=1, 2, ..., is the K-th entry after Z is sorted. For example, if Z=[1, 99, 100], the median of Z is 99. The formula for such computation is stated below:

Assume that the DBS module returns program-id #[n] for the nth frame. To calculate the median for frame i:

Let x=median([#[i] #[i+1] ... #[i+2K]])

Then let y=1−median{[sgn(|#[i]−x|) sgn(|#[i+1]−x|) ... sgn (|#[i+2K]−x|)]} where $$\mathrm{sgn}(x) = \begin{cases} 1 & x > 0 \\ 0 & x = 0 \\ -1 & x < 0 \end{cases}$$

Then, the detected result is a multiplication of x times y. The major feature of this formula is that it can be implemented in one pass rather than an implementation requiring loops and a counter.

2. Identification of Programming.

Given that an audio or video program is detected using majority rule, as explained above, the next step is to impose an additional verification test to determine if there is frame synchronization of the song being detected. In particular, the frame synchronization test checks that the frame-id number output by the DBS module for each p-th frame is a monotonically increasing function over time, that is, as p increases. If it is not, or if the frame indices are random, the detection is declared void. The following are the step-by-step method of the entire SDI. In cases where a portion of the program has been repeated, for example, in a song chorus that may be edited into the program each time, pattern vectors otherwise substantially identical but with varying time frames will be found by the DBS module. In these cases, the system carries these results along by storing them in a buffer and subjects them to the sequencing test explained below. As the sequencing test proceeds, some of these interim results will have time frame indexes that are deemed invalid under the sequencing test and will then be ignored. Once a single interim thread survives, then the start and stop times of the detection are updated.

SDI Algorithm and Steps

Let $s^p$ be a structure that holds the most recent 2K+1 program_id's after the p-th broadcast frame has been detected:

$$s^p = \left\{ \begin{bmatrix} s_{p,1} \\ s_{p,2} \\ \vdots \\ s_{p,P_1} \end{bmatrix}_{\text{1st bin}} \begin{bmatrix} s_{p+1,1} \\ s_{p+1,2} \\ \vdots \\ s_{+1,P_2} \end{bmatrix}_{\text{2nd bin}} \cdots \begin{bmatrix} s_{p+2K,1} \\ s_{p+2K,2} \\ \vdots \\ s_{p+2K,P_{2K+1}} \end{bmatrix}_{(2K+1)\text{th bin}} \right\}$$

Here, $s_{m,n}$=the n-th program_id being detected in the m-th broadcast frame by the DBS module. Note that the $P_m$ is the size of the bin. In general, $P_m$ is different for different m's.

Correspondingly, $f^p$ is another structure holding the corresponding frame numbers or frame indices:

$$f^p = \left\{ \begin{bmatrix} f_{p,1} \\ f_{p,2} \\ \vdots \\ f_{p,P_1} \end{bmatrix}_{\text{1st bin}} \begin{bmatrix} f_{p+1,1} \\ f_{p+1,2} \\ \vdots \\ f_{p+1,P_2} \end{bmatrix}_{\text{2nd bin}} \cdots \begin{bmatrix} f_{p+2K,1} \\ f_{p+2K,2} \\ \vdots \\ f_{p+2K,P_{2K+1}} \end{bmatrix}_{(2K+1)\text{th bin}} \right\}$$

where $f_{m,n}$=the corresponding frame index of $s_{m,n}$.

Also, SI=program_id of the last song or program that was successfully detected, such that the voting test and sequential test was successfully met. A register is created to hold this result until a new and different song or program is detected.

Steps:
1. Compute the majority vote of $s^p$
   Taking every program in the first bin of $s^p$ as the reference. Scan the rest of the 2K bins to determine if any program in the first bin pass the majority vote requirement.

$$w^p = \begin{cases} \{s_{p,m}, m \in D_p\}; & D_p = \text{Indices of entries in the bin of } s^p \text{ that pass the majority vote requirement} \\ 0; & = 0 \text{ if all program in the first bin fail the majority vote requirement} \end{cases}$$

2. If $w^p=0$, $p=p+1$. Go to Step 1.

Else if $w^p$ is a singleton (meaning a set of one element) and not equal to zero Set $SI=w^p$. Go to Step 3.

Else if $w^p$ has more than one candidates

Set $SI=w^p$ (case with multiple program matches). Go to Step 3.

Steps 3 to 7 are performed per $s_{p,m}$ in $w^p$.
3. For every $s_{p,m}$ in $D_p$, form a matrix A from the corresponding frame in $f^p$:

$$A = \begin{bmatrix} 1 & f_1 \\ 2 & f_2 \\ \vdots & \vdots \\ 2K+1 & f_{2K+1} \end{bmatrix}$$

where $f_t$ is the a frame of $s_{p,m}$ in the t-th bin of $f^p$.
If there is no frame in the t-th bin that belongs to $s_{p,m}$, $f_t=0$.
4. Perform the compacting of A, discarding the q-th rows in A where $f_q=0$:

$$A = \begin{bmatrix} 1 & f_1 \\ 2 & f_2 \\ \vdots & \vdots \\ 2K+1 & f_{2K+1} \end{bmatrix} \xrightarrow{\text{discard the } q\text{th row if } f_q=0} B = \begin{bmatrix} k_1 & f_{l_1} \\ k_2 & f_{l_2} \\ \vdots & \vdots \\ k_N & f_{l_N} \end{bmatrix}$$

5. Cleanup A by removing rows, with the following steps:
   A. Start with n=1.
   B. Compute
      $d_1=f_{l_{n+1}}-f_{l_n}$ and $d_2=k_{n+1}-k_n$. After performing step 5 by removing all the entries with mismatched program-id's, this step identifies only those entries that follow the sequencing correctly.
   C. Here, the quantity $d_1$ is the offset of frames between the two detected frames in B. This quantity can also be translated to an actual time offset as well: by multiplying the value by the interframe distance in samples and dividing by the samples per second. The quantity $d_2$ is the frame offset between the two broadcast frames. Now d is the ratio of the two offsets, representing the advance rate of the detected sequence. In particular, in the preferred embodiment, the system expects an ideal rate of 4 as the value for d. However, an elastic constraint on d is applied: If $[d_1 \epsilon (4[d_2-1]+2, 4[d_2-1]+6)]$, the two frames are in the right sequencing order. Thus, with $d_2=1$, an offset of 2 to 6 frames is expected between two adjacent broadcasting frames with the same program-id. If $d_2=2$, the offset is from 2+4 to 6+4 frames. Thus the range is the same except for an additional offset of 4 frames in the range. The values of 2 and 6 are a range centering around the ideal value 4. A range instead of a single value allows the offset to be a bit elastic rather than rigid. To be less elastic, one can choose the range to be from 3 to 5. In the same way, the range can be from 1 to 7 to be very elastic. Go to Step D.

Otherwise, n=n+1, in order to sequence through all the entries in B

If n<N,

Go to Step C.

Otherwise,

Go to Step D.

D. The matrix C is returned. Every row in C consists of the entries that satisfy the sequencing requirement.

Compact B by deleting rows that fail to match the sequencing requirement. Further, note that by taking the first entry of B as the reference, if the second entry fails the sequencing requirement, the process can jump to the third entry to see if it satisfies the sequencing requirement with the first entry. If the second entry is satisfied with the requirement, then the second entry becomes the reference for third entry.

$$B = \begin{bmatrix} k_1 & f_{l_1} \\ k_2 & f_{l_2} \\ \vdots & \vdots \\ k_N & f_{l_N} \end{bmatrix} \xrightarrow[\text{sequencing requirement}]{\text{delete rows that fail the}} C = \begin{bmatrix} j_1 & f_{j_1} \\ j_2 & f_{j_2} \\ \vdots & \vdots \\ j_P & f_{j_P} \end{bmatrix}$$

Majority vote requirement is enforced again here.

If the number of entries in C fails the majority vote requirement, the entry $s_{p,m}$ is not qualified for further test, return to Step 3 for the next entry in $D_p$.

Otherwise, continue onto Step 6.

The majority vote test is applied again because even if the majority vote passes in Step 5, the majority vote test may fail after cleaning up the result with the sequencing rule requirement. If the revised majority vote passes, then a new program or song has been positively detected, otherwise, there is no detection.

6. Let s=Number of entries (i.e. rows) in C.

If s<K,

Go to Step 9.

Else proceed to perform regression analysis:

A. Let $C_1=[C_{11}\ C_{21}\ \ldots\ C_{s1}]^T$ and $C_2=[C_{12}\ C_{22}\ \ldots\ C_{s2}]^T$ be the first and the second columns of C respectively, where the superscript T denotes matrix transposition. Construct the following matrices for regression analysis. Regression analysis is used to calculate a linearity measure of the sequencing of frame-id numbers:

$$D = \begin{bmatrix} \sum_{n=1}^{s} C_{n1}^2 & \sum_{n=1}^{s} C_{n1} \\ \sum_{n=1}^{s} C_{n1} & s \end{bmatrix} \quad E = \begin{bmatrix} \sum_{n=1}^{s} C_{n1} C_{n2} \\ \sum_{n=1}^{s} C_{n2} \end{bmatrix}$$

B. Compute both the slope and the intercept $$\begin{bmatrix} \text{slope} \\ y-\text{intercept} \end{bmatrix} = DE$$

C. Also compute the correlation coefficient r of C.

7. If [r>0.9 AND slope≧2 AND slope≦6], the thread pertaining to the entry $s_{p,m}$ has passed all the test and is a valid entry to the tracking mode. Store the entry $s_{p,m}$ and the corresponding thread into a register called Final_List.

Else, the entry $s_{p,m}$ is discarded.

Continue the test for the next entry in $D_p$.

8. Enter the Tracking Mode. Each thread in the Final_list will be tracked either collectively or separately.

9. Start the tracking mode:

A. Create a small database used for the tracking:
  i. In the collective tracking mode, the small database contains all the pattern vectors of all the qualifying entries in the Final_list.
  ii. In the separate tracking mode, dedicated database containing just the pattern vectors for each particular entry Final_list is created for that entry.

B. If tracking mode=collective tracking,
  i. p=p+1.
  ii. Run detection on the (p+1)th frame of broadcast.
  iii. Update the sequence of each thread. Monitor the merit of each thread by observing if the thread is satisfied with the sequencing requirement.
  iv. Continue the tracking by returning to step i. if there exists at least one thread satisfying the sequencing requirement. Otherwise, exit the tracking.

If tracking mode=separate tracking, use dedicated database for each thread for the tracking. Steps are identical to that of collective tracking.

The sequencing requirement here is the same as what is being used in Step 5c. That is, we expect the id of the detected frame for the new broadcast frame is in a monotonic increasing manner, and the increasing amount between successive frame of broadcast is between 2 to 6 in the preferred embodiment.

If for any thread being tracked, that the new broadcast failed the sequencing requirement relative to the previous frame, a tolerance policy is implemented. That is, each track can have at most Q times of failure, where Q=0, 1, 2, . . . . If Q=0, there is no tolerance on failing the sequencing requirement.

C. After the tracking mode is terminated. Exam the merit of each thread. The thread that has the highest score is the winner of all in the Final_list.
  i. The score can be calculated based on the error between each frame in the thread to the corresponding frame of the broadcast; or based on the duration of the thread. Or both. In our preferred embodiment, the duration is taken as the tracking score of each of thread. The one that endures the longest within the period of tracking is the winner thread.

D. If multiple programs in being posted SI in Step 2. correct the posting by the program_id of the winning thread.

10. Wait for the new p-th frame from the broadcast, Go back to Step 1.

Practitioners of ordinary skill will recognize that the values used in Step 6 for testing the linearity of the sequential frame-id's may be changed either to make the test easier or make the test harder to meet. This controls whether the results increase false positives or suppress false positives while raising or lowering the number of correct identifications as compared to no detections.

Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the Appendices is intended only to provide an extremely detailed disclosure of the present invention and is not intended to be limiting. It is appreciated that any of the software components of the present invention may, if desired, be implemented in ROM (read-only memory) form or stored on any kind of computer readable media, including CD-ROM, magnetic media, or transmitted as digital data files stored in a computer's memory. The software components may, generally, be implemented in hardware, if desired, using conventional techniques.

The spirit and scope of the present invention are to be limited only by the terms of the appended claims.

TABLE 1

| K | $s_{k,1}$ | $s_{k,2}$ |
|---|---|---|
| 10 | 66 | 92 |
| 11 | 93 | 129 |
| 12 | 130 | 182 |
| 13 | 183 | 255 |
| 14 | 256 | 357 |
| 15 | 358 | 501 |
| 16 | 502 | 702 |
| 17 | 703 | 984 |
| 18 | 985 | 1378 |
| 19 | 1379 | 1930 |
| 20 | 1931 | 2702 |
| 21 | 2703 | 3784 |
| 22 | 3785 | 5298 |

TABLE 2

| | |
|---|---|
| 80 | 111 |
| 112 | 156 |
| 157 | 219 |
| 220 | 306 |
| 307 | 429 |
| 430 | 602 |
| 603 | 843 |
| 844 | 1181 |
| 1182 | 1654 |
| 1655 | 2316 |
| 2317 | 3243 |
| 3244 | 4541 |

TABLE 3

| | |
|---|---|
| 66 | 129 |
| 130 | 255 |
| 256 | 501 |
| 80 | 156 |
| 157 | 306 |
| 307 | 602 |

TABLE 4

Starting and Ending Locations of the 31 bands in the generation of robust patterns.

| Starting Location | Ending Location |
|---|---|
| 66 | 92 |
| 93 | 129 |
| 130 | 182 |
| 183 | 255 |
| 256 | 357 |
| 358 | 501 |
| 502 | 702 |
| 703 | 984 |
| 985 | 1378 |
| 1379 | 1930 |
| 1931 | 2702 |
| 2703 | 3784 |
| 3785 | 5298 |
| 66 | 129 |
| 130 | 255 |
| 256 | 501 |
| 80 | 111 |
| 112 | 156 |
| 157 | 219 |
| 220 | 306 |
| 307 | 429 |
| 430 | 602 |
| 603 | 843 |
| 844 | 1181 |
| 1182 | 1654 |
| 1655 | 2316 |
| 2317 | 3243 |
| 3244 | 4541 |
| 80 | 156 |
| 157 | 306 |
| 307 | 602 |

TABLE 5

| Starting Location | Ending Location |
|---|---|
| 67 | 94 |
| 95 | 132 |
| 133 | 186 |
| 187 | 260 |
| 261 | 364 |
| 365 | 511 |
| 512 | 716 |
| 717 | 1004 |
| 1005 | 1406 |
| 1407 | 1969 |
| 1970 | 2756 |
| 2757 | 3860 |
| 3861 | 5404 |
| 67 | 132 |
| 133 | 260 |
| 261 | 511 |
| 82 | 113 |
| 114 | 159 |
| 160 | 223 |
| 224 | 312 |
| 313 | 438 |
| 439 | 614 |
| 615 | 860 |
| 861 | 1205 |
| 1206 | 1687 |
| 1688 | 2362 |
| 2363 | 3308 |
| 3309 | 4632 |
| 82 | 159 |
| 160 | 312 |
| 313 | 614 |

What is claimed:

1. A method executed by a signal processing system for determining whether a portion of a detected audio signal of a pre-determined number of sequential time frame duration is substantially the same signal as a portion of at least one known signal out of a plurality of known audio signals, each portion of the plurality of known signals comprised of a plurality of sequential time frame duration and each time frame of the known audio signal having an identification index and time frame index, comprising:

Calculating for at least one of the time frames of at least one of the known audio signals a first signature comprised of a set of numbers derived from a pre-determined number of spectral magnitude values detected during the time frame;

Storing in a computer database each first signature with a reference to its corresponding signal identification index and a reference to the approximate location in time of the time frame from substantially the beginning of said known signal;

Calculating for at least one of the time frames of the detected signal a second signature comprised of a set of numbers derived from a pre-determined number of spectral magnitude values detected during the time frame;

Selecting from the stored set of first signatures those first signatures that in relation to the second signatures meet a predetermined matching test;

Determining whether the time frame indices corresponding to those selected first signatures meet a sequencing test.

2. The method of claim 1 where the first signature and second signature is calculated by calculating for at least one time frame of either the known audio signal or the unknown signal a pre-determined number of spectral magnitude values grouped in at least one frequency band, where the width of the at least one frequency band is set to be equal to or larger than the magnitude of the frequency shift that results from a pre-determined maximum tolerated amount of shift in the playback speed of the unknown signal.

3. The method of claim 1 where the predetermined matching test comprises:

Calculating a set of absolute values of the differences between each ordinal member of the set of numbers comprising the first signature and each such member's corresponding ordinal member of the set of numbers comprising the second signature;

Calculating a sum of the absolute values; and

Determining whether the sum produces a value less than a pre-determined value.

4. The method of claim 1 where the predetermined matching test comprises:

Calculating a set of absolute values of the difference between each ordinal member of the set of numbers comprising the first signature and each such member's corresponding ordinal member of the set of numbers comprising the second signature;

Calculating a sum of the set of absolute values;

Determining whether the sum is the minimum sum for all the first signatures tested.

5. The method of claim 1 where the predetermined matching test comprises:

Calculating an error value using one of the group of: (i) the approximate vector distance from the first signature to the second signature; (ii) the approximate L-1 norm between the first signature and the second signature; (iii) the approximate maximum difference between any member in the first signature and its corresponding ordinal member in the second signature; (iv) the approximate minimum difference between any member in the first signature and its corresponding ordinal member in the second signature; (v) the approximate average difference between all of the members in the first signature and their corresponding members in the second signature.

6. The method of claim 1 where the sequencing test comprises:

Determining whether the number of first signatures that meet the predetermined matching test have the same identification index is equal to or greater than a number between and including K+1 and 2K+1, where K is evaluated such that 2K+1 is substantially equal to the predetermined number of time frames.

7. The method of claim 1 where the sequencing test comprises:

Determining whether the values of the time frame indices corresponding to matching first signatures with the same identification index increase substantially monotonically in relation to the values of the time frame indices of the matching time frames of the detected signal.

8. The method of claim 1 where the sequencing test comprises:

Determining whether the values of the time frame indices corresponding to matching first signatures with the same identification index are substantially linearly correlated with the values of the time frame indices of the matching time frames of the detected signal.

9. The method of claim 1 where the sequencing test comprises:

Calculating an approximate regression analysis between the values of the time frame indices corresponding to matching first signatures with the same identification index and the values of the time frame indices of the matching time frames of the detected signal.

10. The method of claim 8 where the determining step is comprised of a test whether the linear correlation coefficient is greater than or equal to approximately 0.5.

11. The method of claim 8 where the determining step is comprised of a test whether the linear slope is within a range from and including approximately 2 to and including approximately 6.

12. The method of claim 1 where the time frame indices of the detected signal and a matching known signal are periodically tracked to confirm that in a sequence of at least two time frames the time frame indices of the detected signal increase approximately in correspondence with the increase in the time frame indices of the matching known signal.

13. The method of claim 1 where the signal is comprised of programming of unknown identity that has not been found to match any portion of any known signal further comprised of time frames with corresponding signatures comprising:

Creating an arbitrary identifier with an identification index;

Assigning the identification index to those signatures derived from the signal;

Replacing the arbitrary identifier with a correct identification when the unknown signal is identified.

14. The method of claim 13 further comprising replacing the arbitrary identification index in the database with a pre-existing identification index that references valid identification data identifying the signal.

15. The method of claim 2 where the width of each frequency band contains a different number of frequency magnitude values.

16. The method of claim 1 where the selecting step is comprised of:

Performing a range search of the stored set of first signatures.

17. The method of claim 16 further comprising:
Pre-sorting the stored first signatures;
Maintaining an index table that maps the inverse of the sorting.

18. The method of claim 1 where the selecting step is comprised of transforming the stored set of first signatures into a one-dimensional space.

19. A method executed by an audio signal processing system for determining whether a portion of a detected audio signal of a pre-determined number of sequential time frame duration is substantially the same signal as a portion of at least one known audio signal out of a plurality of a known signals, each portion of the plurality of known signals comprised of a plurality of sequential time frame duration and each time frame of the known signal having an identification index and a time frame index, comprising:

Calculating for at least one of the time frames of at least one of the known signals a first signature comprised of a set of numbers derived from a pre-determined number of frequency magnitude values detected during the time frame;

Storing in a computer database each first signature with a reference to its corresponding known identification index and a reference to the approximate location in time of the time frame from substantially the beginning of said known signal;

Calculating for at least one of the time frames of the detected signal a second signature comprised of a set of numbers derived from a pre-determined number of frequency magnitude values detected during the time frame;

Selecting from the stored set of first signatures those first signatures that meet a predetermined matching test with the second signatures;

Storing in at least one data structure and the time frame indices and the identification indices corresponding to the matching first signatures;

Deleting from the data structures those time frame indices and corresponding identification indices where fewer than approximately K+1 enters in the list have the same identification index, where K is calculated such that 2K+1 is equal approximately to the predetermined number of time frames constituting the portion of the detected signal;

Deleting from the list those time frame indices and identification indices where the time frame indices of the first signature are not confirmed to increase substantially in synchrony with the time frame indices of the detected signal.

20. A method executed by a audio signal processing system of searching a database comprised of a set of at least one predetermined first signatures with corresponding identification indices and time frame indices, where each first signature represents the frequency components of a known audio signal during the time frame, the search looking for all first signatures that meet a pre-determined matching test with a second signature, where the second signature represents the frequency components of a detected audio signal during a time frame, comprising:

Storing in computer memory a first data array comprised of all of the first signatures, whereby the n-th row in the first data array is the set of members of the n-th first signature;

For at least one column in the first data array, sorting within the computer memory, the elements of the column in either ascending or descending order;

Storing in computer memory an additional data array where one element in the second data array corresponds to an element in the one column of the first data array, and the value of the one element in the second data array cross-indexes to where the corresponding element in the first data array originated prior to the sorting step;

Applying a search using the second signature to find best match between the second signature and the rows of the first data array;

Recovering the identification index and time frame index of any matching first signature by using the cross-index of the second data array and applying it in the matching row.

21. The method of claim 20 where, the search algorithm is one of: binary search, B Tree, linear search, heuristic tree searching, depth first search, breadth first search.

22. A method executed by an audio signal processing system of searching a database comprised of at least one first signature representing a first audio signal using a query comprised of a second signature where the first and second signatures are both sets of a predetermined number of elements, each element a number, comprising:

For each first signature, applying a predetermined calculation to calculate a first integer as a function of a subset of elements comprising each first signature said elements derived from spectral magnitudes detected in the first audio signal;

Storing in a computer memory location corresponding to the value of the first integer a reference to the corresponding first signature used in calculating the first signature;

Calculating a second integer using the same predetermined calculation applied to the corresponding subset of the second signature said elements derived from spectral magnitudes detected in a second audio signal;

Selecting memory locations corresponding to integer values within a predetermined error function from the second integer;

Determining any first signatures and their identification index and time frame index corresponding to the selected memory locations.

23. The method of claim 22 where the predetermined calculation is a linear combination of at least two elements of the signature.

24. The method of claim 22 where the subset has less than five elements of the first signatures.

25. A machine comprising a central processing unit, a digital data transceiver device and a data storage device comprised of any machine readable media, where the machine readable media contains a computer program that when executed by the machine, performs any one of the methods of claim 1-24 or 13-14.

26. A non-transitory machine readable media, which contains data that is a computer program that when executed by a computer, performs any one of the methods of claim 1-24 or 13-14.

* * * * *

UNITED STATES PATENT AND TRADEMARK OFFICE
CERTIFICATE OF CORRECTION

PATENT NO. : 8,468,183 B2
APPLICATION NO. : 10/598283
DATED : June 18, 2013
INVENTOR(S) : Kwan Cheung Page 1 of 1

It is certified that error appears in the above-identified patent and that said Letters Patent is hereby corrected as shown below:

In the Claims

Column 28, Line 7: add the word --and-- between the words test and have

Column 30, Line 57: correct the claim numbers "1-24 or 13-14" to "1-14 or 19-24"

Column 30, Lines 60-61: "1-24 or 13-14" to "1-14 or 19-24"

Signed and Sealed this
Fifth Day of November, 2013

Teresa Stanek Rea
*Deputy Director of the United States Patent and Trademark Office*